No. 871,536. PATENTED NOV. 19, 1907.
E. THOMPSON.
SEED SEPARATOR.
APPLICATION FILED MAY 4, 1906.

2 SHEETS—SHEET 1.

Witnesses.
E. W. Jeppesen.
A. H. Opsahl.

Inventor.
Edward Thompson.
By his Attorneys.
Williamson Merchant

THE NORRIS PETERS CO., WASHINGTON, D. C.

No. 871,536. PATENTED NOV. 19, 1907.
E. THOMPSON.
SEED SEPARATOR.
APPLICATION FILED MAY 4, 1906.

2 SHEETS—SHEET 2.

Witnesses.
E. W. Jeppson,
A. H. Opsahl.

Inventor.
Edward Thompson.
By his Attorneys.
Williamson Merchant

THE NORRIS PETERS CO., WASHINGTON, D. C.

UNITED STATES PATENT OFFICE.

EDWARD THOMPSON, OF MINNEAPOLIS, MINNESOTA.

SEED-SEPARATOR.

No. 871,536.  Specification of Letters Patent.  Patented Nov. 19, 1907.

Application filed May 4, 1906. Serial No. 315,176.

*To all whom it may concern:*

Be it known that I, EDWARD THOMPSON, a citizen of the United States, residing at Minneapolis, in the county of Hennepin and State of Minnesota, have invented certain new and useful Improvements in Seed-Separators; and I do hereby declare the following to be a full, clear, and exact description of the invention, such as will enable others skilled in the art to which it appertains to make and use the same.

My invention has for its object to provide an improved machine for separating round particles, such as mustard seed, from flat or irregularly formed particles, such as wheat, oats, cockle, pigeon grass, and the like, and to this end it consists of the novel devices and combinations of devices hereinafter described and defined in the claims.

In accordance with my invention I employ one or more smooth conical disks that are arranged to rotate on an oblique or inclined axis; and the separation is due to a tendency of the said round particles to run over a flat smooth surface of less inclination than that required to cause the more irregular particles to move thereon.

The improved machine in its preferred form is illustrated in the accompanying drawings, wherein like characters indicate like parts throughout the several views.

Figure 1:
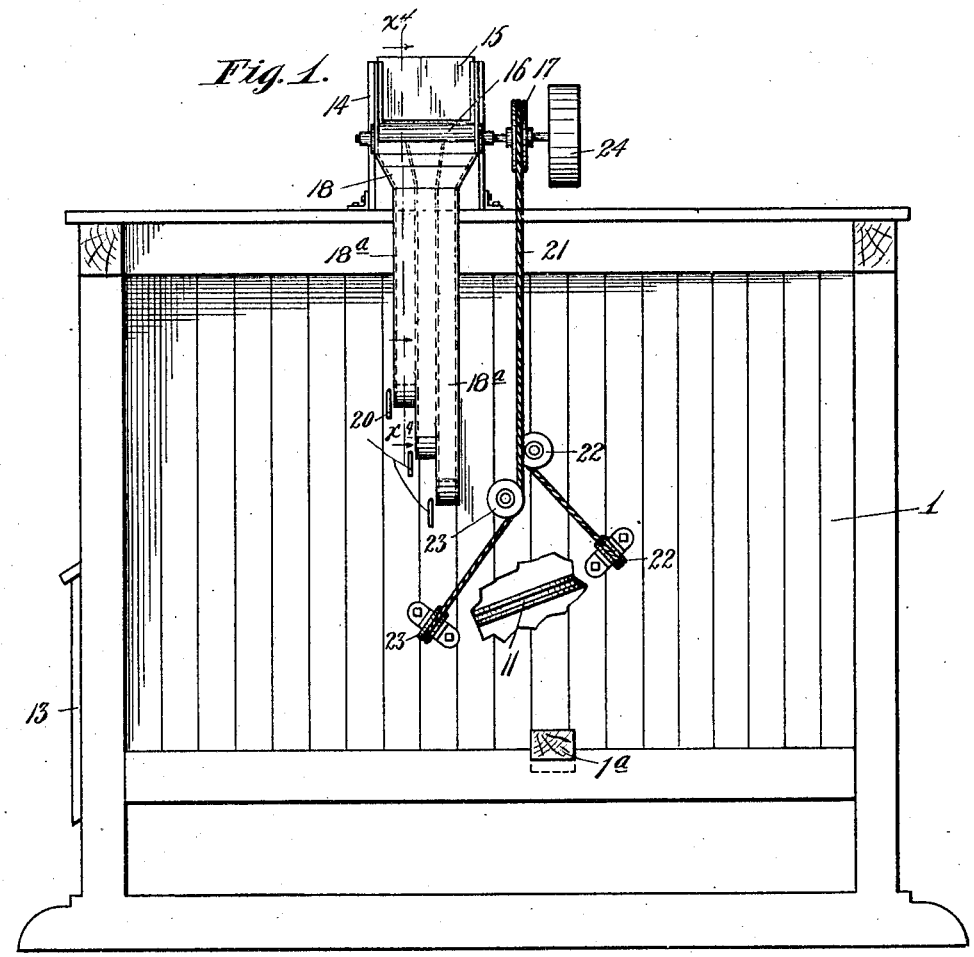
Figure 2:
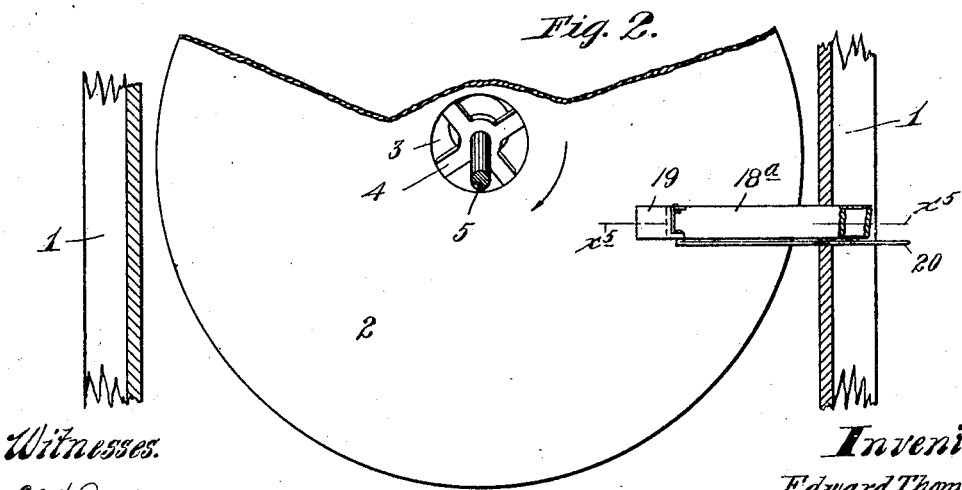
Figure 3:
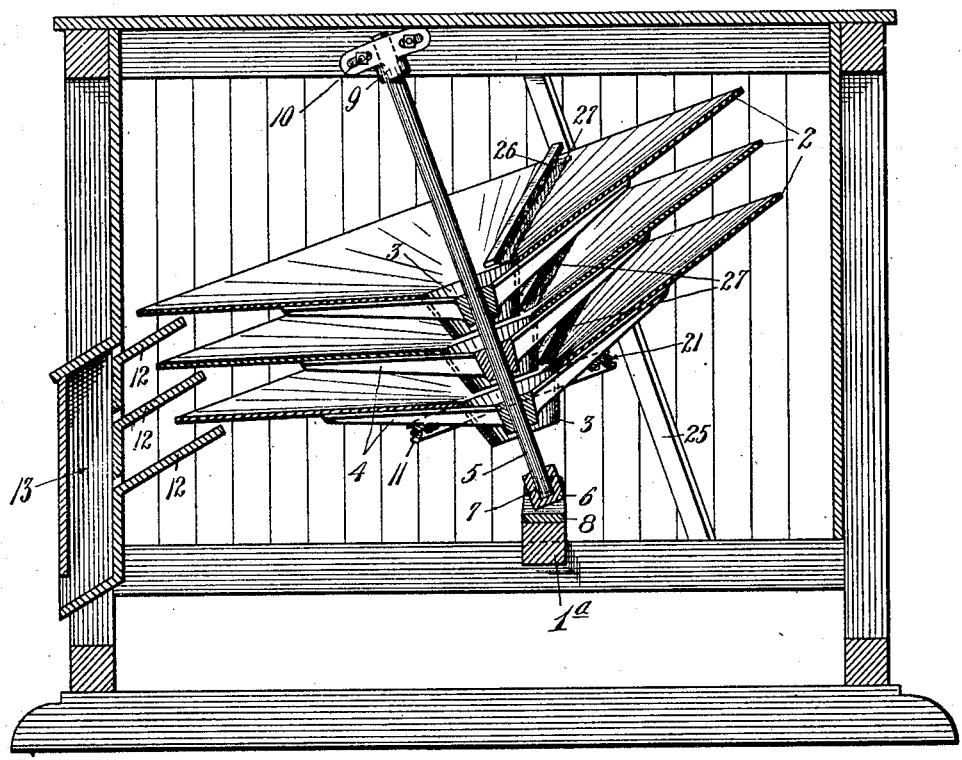
Figure 4:
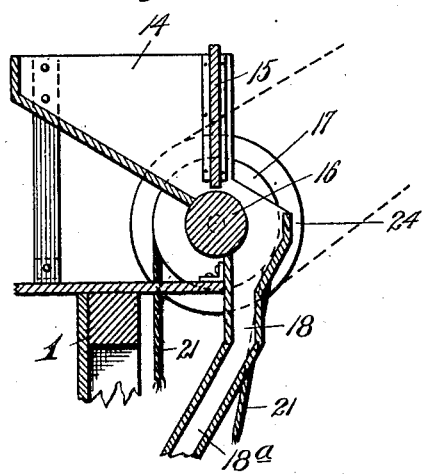
Figure 5:
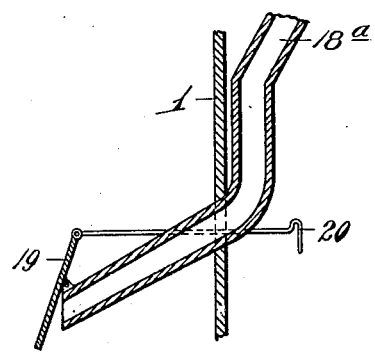

Referring to the drawings, Figure 1 shows the improved machine in side elevation. Fig. 2 is a fragmentary view partly in plan and partly in section showing one of the disks and a portion of the machine case, and a portion of one of the grain delivery spouts, some parts being broken away. Fig. 3 is a vertical section taken centrally through the machine, at a right angle to the direction in which the parts shown in Fig. 1 are viewed. Fig. 4 is a detail in section on the line $x^4 x^4$ of Fig. 1, and Fig. 5 is a detail in section on the line $x^5 x^5$ of Fig. 2.

The numeral 1 indicates the box-like case of the machine, the same being shown as rectangular.

2 indicates the conical separating disks of the machine, of which, as shown, there are three, arranged one over the other. At their lower central portions these disks are provided with depending discharge sleeves 3 and with spider brackets 4, the hubs of which brackets are rigidly secured to an inclined or obliquely set shaft 5. The lower end of this shaft 5 is journaled in a bearing box 6, which in turn is pivoted at 7 to a bearing bracket 8 rigidly secured to one of the transverse lower bars $1^a$ of the case 1. The upper end of said shaft is journaled in a bearing 9 which is adjustably secured to one of the transverse upper beams of the case 1, as shown, by means of bolt and slot connections 10, shown in Fig. 3. To the lower spider 4 is secured a large sheave 11. These several disks 2 are so set that their lower portions incline slightly outward, but this inclination or pitch may be varied to set the machine for the proper separation of different materials, by adjustments of the upper end of the shaft bearing 9. The lower portions of the several disks discharge individually onto inclined shelves 12 that direct the material into a common discharge spout 13, shown as secured to and formed as part of the case 1.

The screenings are delivered into a hopper 14 secured on top of the case 1, and, as shown, are provided with an adjustable discharge gate 15. Working in the bottom of the hopper 14 is a roller 16, having at one end a sheave 17 and arranged to deliver the screenings from the hopper 14 into a spout 18; which spout is provided with a plurality of discharge branches $18^a$ that extend into the case and terminate each over one of the disks 2, substantially as shown in Fig. 2. Pivoted to the ends of each discharge spout branch $18^a$ is a valve 19 that is arranged to be operated by a rod 20. The rods 20 extend outward and work frictionally through perforations in one side of the case 1 and terminate in hand pieces, by means of which they may be operated. The valves 19 serve to open and close the spouts $18^a$, and, furthermore, serve as deflecting plates to vary, to a considerable extent, the points of delivery on to the respective disks. The disks should be rotated in the direction of the arrow marked thereon in Fig. 2, and the screenings should be delivered on to the disks near their upper portions.

A driving cable 21 runs over the sheave 17 of the roller 16, over the sheave 11 on the lower spider bracket 4, and over idle guide sheaves 22 and 23 mounted on one side of the case 1, as best shown in Fig. 1. On the shaft of the roller 16 is a pulley 24, over which a power-driven belt (not shown) will run to transmit motion to the roller 16 and to the several disks 2.

The numeral 25 indicates a supporting bar which is secured within the case 1, and is provided with arms 26 that closely overlie the respective disks 2 and extend radially thereof a little forward of their highest portions, as shown in Fig. 3. To each of these arms 26 is attached a strip of cloth or other light flexible material 27, that loosely rests upon the upper surface of the respective disks.

The operation of the machine in separating mustard seed from screenings is substantially as follows: The screenings being delivered to the several disks through the branch spouts 18$^a$ will, under the rotation of said disks, be carried downward to the lowest portions thereof, where most of the round mustard seed will run directly off from the said disks and onto the receiving shelves 12. Some of the mustard seed will be blocked or held by other portions of the screenings so that they will not readily run off from the lowest and most nearly horizontal portions of the disks; and these will be carried upward by the disks until the gradually increasing pitch or inclination of the disks becomes so great that all particles of the screenings are caused to move, to some extent, thereby liberating the other portions of the mustard seed and allowing the same to run downward, under the action of gravity, and off from the said disks onto the said receiving shelves 12. It is evident, therefore, that whenever there is the least disturbance of the screenings on the disks, the mustard seed being round will run rapidly away from the more irregular particles of the screenings, and will rapidly run off from the disks, while the said irregular particles, such as oats, wheat, cockle, pigeon grass, or the like, will move very slowly upon the disks. In practice I have found that these so-called irregular particles, on account of their greater frictional contact with the disks, will adhere thereto or move very slowly thereon, until they have been carried so high up on the disks and so nearly to the points where the disks have their greatest inclination that when they are finally caused to move downward by the very greatly increased pitch of the disks they will run directly into the discharge sleeves 3 of the said disks, and will pass from thence directly through the central openings of the disks, and will be discharged therefrom to the bottom of the case. The light flexible scrapers or agitators 27 are provided because it sometimes happens that some particles of the screenings will quite firmly adhere thereto, and will not run downward unless they are moved slightly, but will then freely run downward over the steep portions of the disks.

Very frequently flax, as well as mustard seed, is mixed with screenings. I have found that flax seeds, even though quite flat, will on account of their extreme smoothness run over and off from the disks very much in the same manner as the mustard seed. The flax seed, if contained in the screenings, will therefore be discharged with and commingle with the mustard seed. The flax seed and mustard seed may, of course, be separated by means which does not relate to this application. However, there is a good market for commingled flax and mustard seed, for, as a matter of fact, they are in practice frequently boiled together in making linseed oil, and the mustard seeds add desirable properties to the residue known as "oil cakes."

Screenings with the flax and mustard seed removed therefrom bring a higher price than when mixed with these seeds; and the mustard seed and flax seed, when separated, bring a much higher price than the screenings. Hence, as is obvious, a machine that will effect these separations in a practical and economical manner has very considerable merit.

I claim as my invention:

1. In a separator of the kind described, the combination with a rotatively mounted inverted smooth faced conical disk having a central opening and an oblique axis of rotation, the said conical disk being so set that its lowermost portion inclines outward and downward from its axis of rotation, and its uppermost portion inclines inward and downward toward its axis of rotation, whereby said disk during its rotation will discharge the round smooth seed at its lower peripheral portion, and the relatively flat seeds and other substances will be carried upward and discharged through the central opening of said disk, by the action of gravity.

2. In a separator of the kind described, the combination with a rotatively mounted inverted smooth faced conical disk having a central opening and an oblique axis of rotation, the said disk being so set that its lowermost portion inclines outward and downward from its axis of rotation, and its uppermost portion inclines inward and downward toward its axis of rotation, and a brush working over the upper portion of said disk, whereby the round seeds will be discharged at the lower peripheral portion of said disk, and the relatively flat seeds and other substances will be carried upward by said disk and discharged through the central opening thereof, by the action of gravity and of the said brush, substantially as described.

In testimony whereof I affix my signature in presence of two witnesses.

EDWARD THOMPSON.

Witnesses:
 MALIE HOEL,
 F. D. MERCHANT.